(12) United States Patent
Norlund et al.

(10) Patent No.: US 11,697,239 B2
(45) Date of Patent: Jul. 11, 2023

(54) EXTRUSION INSTALLATION HAVING A MONITOR SYSTEM SUITABLE FOR DETECTING AN ANOMALY, AND AN ASSOCIATED METHOD

(71) Applicant: ARIANEGROUP SAS, Paris (FR)

(72) Inventors: Samuel Lars Norlund, Saint-Laurent des Hommes (FR); Vincent Ambit, Bordeaux (FR); Philippe Honorat, Audenge (FR)

(73) Assignee: ARIANEGROUP SAS, Paris (FR)

( * ) Notice: Subject to any disclaimer, the term of this patent is extended or adjusted under 35 U.S.C. 154(b) by 1266 days.

(21) Appl. No.: 16/198,942

(22) Filed: Nov. 23, 2018

(65) Prior Publication Data

US 2019/0152119 A1 May 23, 2019

(30) Foreign Application Priority Data

Nov. 23, 2017 (FR) ....................................... 1761105

(51) Int. Cl.
*B29C 48/92* (2019.01)
*G01N 29/11* (2006.01)
(Continued)

(52) U.S. Cl.
CPC ............. *B29C 48/92* (2019.02); *B29C 48/402* (2019.02); *B29C 48/96* (2019.02); *G01N 29/11* (2013.01);
(Continued)

(58) Field of Classification Search
CPC ....... B29C 48/92; B29C 48/96; B29C 48/402; B29C 2948/92542; B29C 2948/92057;
(Continued)

(56) References Cited

U.S. PATENT DOCUMENTS

| 6,824,626 B2 * | 11/2004 | Charrette | ................. C06D 5/06 |
| | | | 149/19.91 |
| 2014/0366633 A1 * | 12/2014 | Schroeder | .............. G01N 29/11 |
| | | | 73/598 |

(Continued)

FOREIGN PATENT DOCUMENTS

| DE | 10 2013 013902 A1 | 3/2014 | |
| JP | 63139705 | * 6/1988 | ............... B29B 7/42 |

(Continued)

OTHER PUBLICATIONS

Preliminary Search Report as issued in French Patent Application No. 1761105, dated Aug. 7, 2018.

*Primary Examiner* — Galen H Hauth
*Assistant Examiner* — Shibin Liang
(74) *Attorney, Agent, or Firm* — Pillsbury Winthrop Shaw Pittman LLP

(57) ABSTRACT

A method of extruding a material including a binder and one or more energetic fillers and using an installation including an extruder including a sheath having at least one extrusion screw present therein, the extruder having at least one acoustic sensor fastened on the sheath, and a monitor system suitable for detecting an anomaly as a function of the acoustic signal picked up by the acoustic sensor, the monitor system being configured to measure variations in the amplitude of the acoustic signal picked up by the acoustic sensor, the method including an extrusion step for extruding the material through the extruder during which the acoustic signal picked up by the sensor is analyzed by the monitor system, and a detection step for detecting variation in the composition of the extruded material from variation in the amplitude of the acoustic signal.

6 Claims, 2 Drawing Sheets

(51) Int. Cl.
  *G01N 29/12* (2006.01)
  *B29C 48/40* (2019.01)
  *B29C 48/96* (2019.01)

(52) U.S. Cl.
  CPC ........ *G01N 29/12* (2013.01); *B29C 2948/924* (2019.02); *B29C 2948/92057* (2019.02); *B29C 2948/92542* (2019.02); *B29C 2948/92885* (2019.02)

(58) Field of Classification Search
  CPC .... B29C 2948/92885; B29C 2948/924; B29C 48/57; B29C 48/68; B29C 45/62; B29C 47/92; G01N 29/11; G01N 29/12; G01N 29/22; G01N 33/44; B29B 7/42; B29B 7/72; G08B 7/06
  See application file for complete search history.

(56) References Cited

U.S. PATENT DOCUMENTS

| | | |
|---|---|---|
| 2016/0046055 A1 | 2/2016 | Praher |
| 2017/0246789 A1 | 8/2017 | Siebigteroth |

FOREIGN PATENT DOCUMENTS

| | | | | |
|---|---|---|---|---|
| JP | 63-139705 | 11/1988 | | |
| JP | H02-4435 A1 | 1/1990 | | |
| JP | 5-309721 | 11/1993 | | |
| KR | 20180133741 | * 6/2017 | ............ | B29C 47/92 |
| WO | 2014/179047 | 11/2014 | | |
| WO | 2016/181361 | 11/2016 | | |

\* cited by examiner

EXTRUSION INSTALLATION HAVING A MONITOR SYSTEM SUITABLE FOR DETECTING AN ANOMALY, AND AN ASSOCIATED METHOD

CROSS REFERENCE TO RELATED APPLICATIONS

This application claims priority to French Patent Application No. 1761105, filed Nov. 23, 2017, the entire content of which is incorporated herein by reference in its entirety.

FIELD

The present invention relates to the general field of extrusion installations, and more particularly it relates to an extrusion installation including means for acting continuously to detect operating anomalies.

BACKGROUND

Extruders are used in known manner in industries where it is desired to form a material through a die having the section of the part that is to be obtained. As a general rule, a part of elongate shape is formed, and subsequently the part may possibly be cut to length. It is possible to use materials as various as metals, plastics, rubbers, materials comprising a polymer binder with fillers, in particular energetic fillers, foodstuffs, or pharmaceuticals.

It is difficult to monitor the process of fabrication using an extruder because of the continuous nature of the process and because of the confinement of the means that serve to compress and advance the material, generally inside one or more sheaths. By way of example, such means may comprise one or more augers housed inside the sheath(s). Thus, it is often not possible to detect an anomaly before the equipment fails and without having to disassemble the extruder, or to detect a problem in the extruded material before it leaves the extruder so as to enable it to be analyzed.

There therefore exists a need for an extrusion installation that makes it possible to act continuously to detect operating anomalies in the operation of the extruder.

SUMMARY

An aspect of the present invention thus is directed to enabling operating anomalies to be detected continuously in an extruder, by proposing, in a first aspect, and extrusion installation comprising:
  an extruder comprising a sheath having at least one extrusion screw present therein, the extruder having at least one acoustic sensor fastened on the sheath; and
  a monitor system suitable for detecting an anomaly as a function of the acoustic signal picked up by the acoustic sensor.

The installation of the invention provides non-destructive and passive monitoring means for detecting anomalies in an extruder having at least one extrusion screw. The acoustic sensor fastened on the sheath of the extruder is sensitive to events occurring in the extruder that may be continuous or one-off and giving rise to acoustic vibration. Depending on the signals transmitted by the sensor, the monitor system can thus detect an anomaly in the operation of the extruder or in the extrusion process being performed in the extruder. The sensor is fastened on the sheath in such a manner that acoustic vibration of the sheath can be measured by the sensor. The acoustic sensor associated with the monitor system can serve to identify variations in the amplitude (or the energy) of the acoustic signal, and/or to analyze the signal in frequency terms.

In an example, the presence of repetitive discrete events at a frequency of the same order as the speed of rotation of the screw inside the sheath can be the result of contact between the screw and the sheath, which needs to be corrected, e.g. by recentering the screw inside the sheath. In another example, when the amplitude of the signal decreases after introducing a binder into the extruder, that means that a lubrication phenomenon is taking place inside the extruder. Conversely, an increase in the amplitude of the signal may be the consequence of variation in the composition of the material inside the extruder. If such a variation in amplitude is not expected, it may serve to detect an anomaly in the composition of the extruded material. More simply, picking up a short signal of large amplitude can make it possible to detect quickly the introduction of a foreign body into the inside of the extruder. Thus, the installation of the invention provides a system for rapidly detecting anomalies in the operation of the extruder, whether they be mechanical anomalies associated with the operation of the machine or else anomalies associated with the lubrication or the composition of the material being extruded.

In an embodiment, the extruder may include at least two extrusion screws, in which case the process may be referred to as a "twin-screw" process. Under such circumstances, the acoustic sensor may also serve to detect contact between the two screws, in the event of an acoustic signal having discrete events that are repeated at a frequency close to the speed of rotation of the screws (or to a multiple of that speed).

In an embodiment, the acoustic sensor may be fastened on the sheath by means of a magnet. The use of a magnet beneficially makes it possible to remove the sensor or to move it easily on the sheath. In a variant, the acoustic sensor may be adhesively bonded to the sheath.

In an embodiment, a plurality of acoustic sensors may be fastened on the sheath, each of these sensors being connected to the monitor system. This provision serves to improve accuracy in the detection of anomalies.

In an embodiment, the acoustic sensors may be distributed circumferentially around the sheath. This provision is beneficial when it is desired to be able to localize more accurately the position of the anomaly, e.g. of contact between the screw and the sheath, in a given segment of the extruder.

In an embodiment, the acoustic sensors may be distributed longitudinally along the sheath. This provision is beneficial when the sheath is of considerable length, or is made up of a plurality of consecutive sheath portions that are connected to one another, and it is desired by way of example to locate the anomaly more accurately along the extruder.

In an embodiment, the monitor system is configured to perform frequency and/or amplitude analysis of the acoustic signal picked up by the acoustic sensor.

In a second aspect, an aspect of the invention also provides a method of extruding a material while using an installation as set out above, the method comprising an extrusion step for extruding the material through the extruder during which the acoustic signal picked up by the sensor is analyzed by the monitor system, in order to detect an anomaly.

In an implementation, the extruded material may comprise a binder and one or more energetic fillers. Under such circumstances, the invention presents a major benefit in terms of safety. Specifically, the acoustic sensor is a passive tool that can operate without requiring energy to be delivered to the proximity of the extruder. When an energetic material is extruded, the use of a passive sensor thus reduces any risk of uncontrolled explosion of the material. In addition, by means of the invention, it is possible to detect contact between the screw and the sheath, or between two screws, if there are screws, which might create sparks inside the sheath. By detecting such contacts immediately, the appearance of sparks that might initiate combustion is avoided, thereby further increasing safety. Finally, when extending a material comprising a binder with energetic fillers, the possibility of detecting variations in the composition of the material makes it possible to anticipate a material being formed inside the extruder that is of increased sensitivity (e.g. as a result of a variation in the binder/filler ratio), thereby also improving safety.

BRIEF DESCRIPTION OF THE DRAWINGS

Other characteristics and benefits of the present invention appear from the following description made with reference to the accompanying drawings, which show embodiments having no limiting character. In the figures.

DETAILED DESCRIPTION

Figure 1:
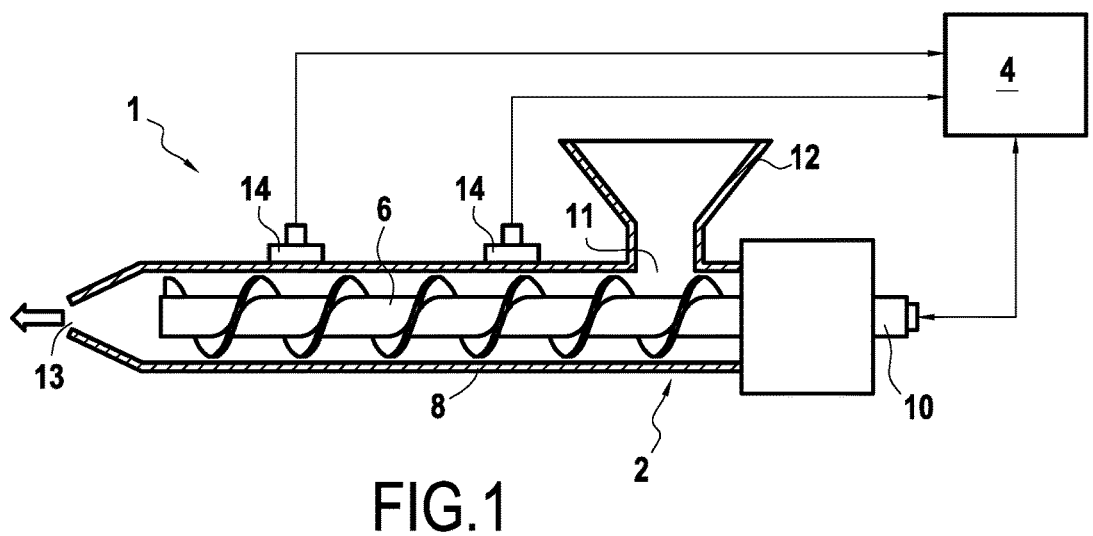
FIG. 1 is a diagrammatic section view of a first embodiment of an installation of the invention having a single-screw extruder.

FIG. 1 is a highly diagrammatic section view of an installation 1 of the invention. The installation comprises an extruder 2 and a monitor system 4. The extruder 2 shown by way of example is an extruder having a single screw 6, e.g. an auger, housed inside a sheath 8. The sheath 8 may be generally cylindrical in shape, and may possibly present varying section. The role of the screw 6 is to cause the material for extrusion to advance inside the extruder 2. The extruder 2 thus has a motor 10 configured to rotate the screw 6 inside the sheath 8 at a predetermined speed of rotation. At one end of the sheath 8, in the proximity of the motor, there is a top opening 11 into which a hopper 12 opens out, whereby the material for extruding is to be inserted into the extruder 2. At one end of the sheath 8 remote from the motor 10 there is an outlet 13 from the extruder that may be provided with various tools (not shown) for shaping the extruded material.

In accordance with an embodiment of the invention, the extruder 2 in this example has two acoustic sensors 14 distributed longitudinally along the sheath 8. By way of example, the acoustic sensors 14 are provided with magnets in order to fasten them in reversible manner on the sheath 8. In this example, the acoustic sensors 14 are fastened on an outside surface of the sheath. In this example, the acoustic sensors 14 are connected to the monitor system 4 in passive manner, i.e. no electrical energy is transmitted to the acoustic sensors 14 by the monitor system 4. It will be appreciated that the number of sensors 14 could be adapted as a function of needs, and in particular as a function of the size of the extruder 2.

In the example shown, the monitor system 4 may be configured to control the motor of the extruder 2. For example, the monitor system 4 may be configured to stop the screw 6 rotating in the event of an anomaly being detected inside the extruder 2 by using the acoustic sensors 14.

In particular, the monitor system 4 may be suitable for performing continuous analysis of the frequency and/or of the amplitude of the acoustic signal picked up by the acoustic sensors 14 and to stop the extruder 2, and in particular its motor 10, in the event of an anomaly being detected. By having the sensors 14 distributed longitudinally along the sheath, it is possible to obtain an estimate of the longitudinal position of the detected anomaly, if any.

When a foreign body becomes accidentally inserted into the extruder 2 while it is in operation (whether empty or not), the acoustic sensors 14 pick up a short signal of large amplitude, which can be detected by the monitor system 4 so that it can stop the extruder 2 immediately. While the extruder is in operation (whether empty or not) and when the signal as picked up comprises discrete events that repeat at a regular frequency close to the speed of rotation of the screw 6 within the sheath 8 (or at a multiple thereof), that might be the consequence of contacts and/or friction between the screw 6 and the sheath 8. By analyzing the frequency of the signal, the monitor system can detect such an anomaly and can stop the extruder 2 immediately, e.g. so as to enable an operator to realign or recenter the screw 6 within the sheath 8.

While the extruder is in operation, the amplitude (or the energy) of the acoustic signal picked up by the sensors 14 may be observed to vary over time. In general manner, while extruding a material that comprises a binder with energetic fillers, it is observed that a reduction in amplitude is correlated with introducing more binder into the extruder. This effect is generally due to the lubrication performed by the binder, and also to the reduction in the density of the material. Consequently, should the amplitude of the acoustic signal measured by the sensors 14 increase after more binder has been introduced, the monitor system 4 can detect an anomaly associated with introducing binder into the extruder 2 and can stop it. It can also be observed that if the amplitude increases to a large extent, e.g. by more than 30% or 40% over a period of about ten seconds, compared with a constant mean amplitude beforehand, that might be due to drift in the composition of the material, and in particular to an increase in the filler content of the material. Consequently, should the amplitude increase to a large extent when there is no change in the composition being introduced into the extruder 2, the monitor system 4 can detect an anomaly concerning drift in the composition of the extruded material and can stop the extruder 2.

Figure 2:
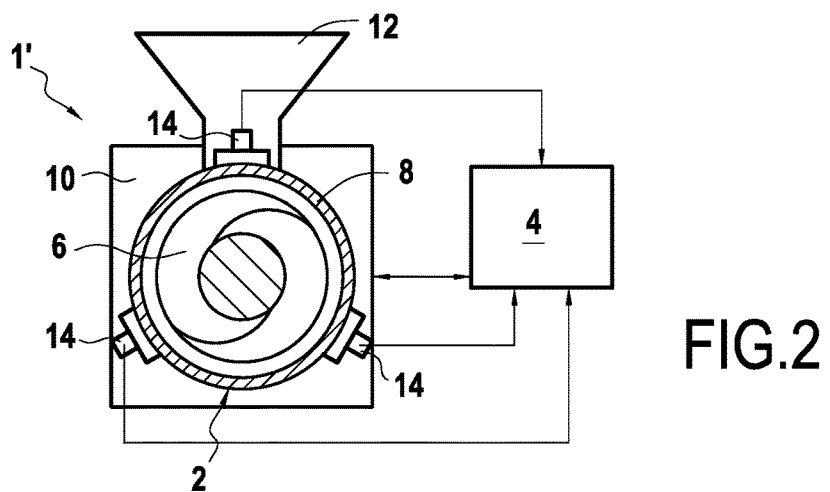
FIG. 2 is a diagrammatic end view of a second embodiment of an installation of the invention having a single-screw extruder.

FIG. 2 shows a second installation 1' of the invention. Unless mentioned to the contrary, identical reference signs in the various figures designate characteristics that are identical. The extruder 2 is shown end-on, i.e. looking at the outlet 13. In this embodiment, the installation 1' still comprises an extruder 2 having one screw 6 housed inside a sheath 8. In this embodiment, the extruder 2 has three acoustic sensors 14 that are no longer distributed longitudinally along the sheath 8 as in the above embodiment, but rather are distributed circumferentially around the sheath 8. This configuration serves to increase the reliability of measurements. This configuration can also make it possible to estimate the position of an anomaly in a transverse plane of the sheath by analyzing the signals that come from each of the sensors 14.

Figure 3:
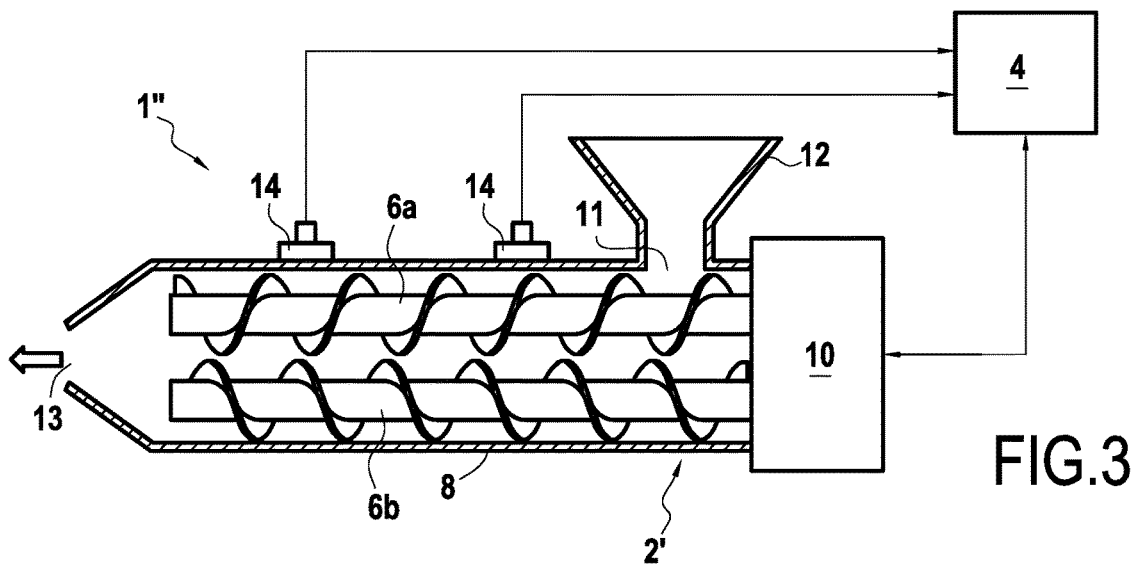
FIG. 3 is a diagrammatic section view of a third embodiment of an installation of the installation having a twin-screw extruder.

FIG. 3 shows a third embodiment of an installation 1" of the invention. In this embodiment, the extruder 2' has two screws 6a and 6b that may be contrarotating or corotating. The extruder 2' is then said to be a "twin-screw" extruder. The operation of the extruder 2' is similar to that of the extruder 2 of the above embodiment. In this embodiment, the sensors 14 are arranged on the sheath 8 along its length, in the same manner as in the installation 1.

An extrusion method of an embodiment of the invention comprises a step of extruding material through an extruder 2 or 2', during which the acoustic signal picked up by the sensor(s) 14 is analyzed by the monitor system 4 in order to detect an anomaly, such as one of the anomalies described above. The step of extruding the material may include prior introduction of the material into the inside of the extruder 2 or 2', e.g. into the hopper 12. The method may comprise a step of continuously detecting an anomaly, in which the acoustic signal from at least one acoustic sensor is picked up and is analyzed in frequency and/or in amplitude, from which the presence of an anomaly in the extruder can be deduced. The method may also include a step during which the operation of the extruder is interrupted if an anomaly is detected. By way of example, and as described above, an anomaly may be associated with the composition of the extruded material, with contact between mechanical parts inside the extruder, or with a foreign body being introduced into the extruder.

By way of example, the extruded material may comprise a binder, e.g. a polymer binder, together with one or more energetic fillers. It is also possible to introduce a curing agent when the binder comprises a polymer that is to be cured. Under such circumstances, the invention serves to increase the safety of the extrusion installation since no energy is delivered in the proximity of the material while it is being extruded in order to monitor the extrusion, and extrusion of the material can be interrupted immediately in the event of an anomaly being detected. In particular, if the anomaly is a contact between the screw and the sheath or between two screws, if there are screws, it is possible to reduce the appearance of sparks by detecting such contact quickly.

In the above-described installations 1, 1', and 1", a plurality of sensors 14 are always used. Naturally, in a variant, it would be possible to use a single sensor 14 positioned on the sheath 8, or some larger number of sensors 14 than in the embodiments described. In known manner, a temperature control system may be present in the sheath 8 or in its proximity in order to regulate the temperature within the extruder, such system possibly comprising a cooling fluid or a fluid that is heated in temperature regulation channels. Finally, the sheath 8 is shown in all of the embodiments as being a single part, however, in a variant, it could be segmented and could comprise a plurality of portions that are fastened to one another in the longitudinal direction of the sheath 8.

Example 1

Figure 4:
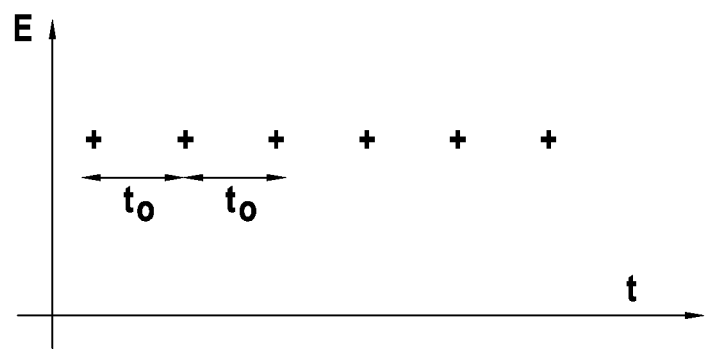
FIG. 4 is a graph plotting variation in the amplitude of a signal measured by a sensor as a function of time in the event of a screw making contact with the sheath.

FIG. 4 is a diagram showing the amplitude E of the acoustic signal picked up by an acoustic sensor positioned on the sheath of a single-screw extruder as shown in FIGS. 1 and 2, and plotted as a function of time. While this measurement is being taken, the extruder is operated empty, i.e. no material is present inside it.

A discrete type signal can be seen comprising periodic pulses that are separated by a duration $t_0$ that is substantially constant. The time $t_0$ in minutes may be compared with the frequency of rotation of the screw of the extruder expressed in revolutions per minute and it is observed that $1/t_0$ is close to this frequency of rotation or to a multiple of this frequency. This type of signal is characteristic of contact between the screw and the sheath. Thus, by configuring the monitor system to detect the presence of a signal made up of short pulses at regular intervals, and in particular by analyzing its frequency, the monitor system can inform the operator about the presence of contact between the screw and the sheath and can stop the extruder.

Example 2

Figure 5:
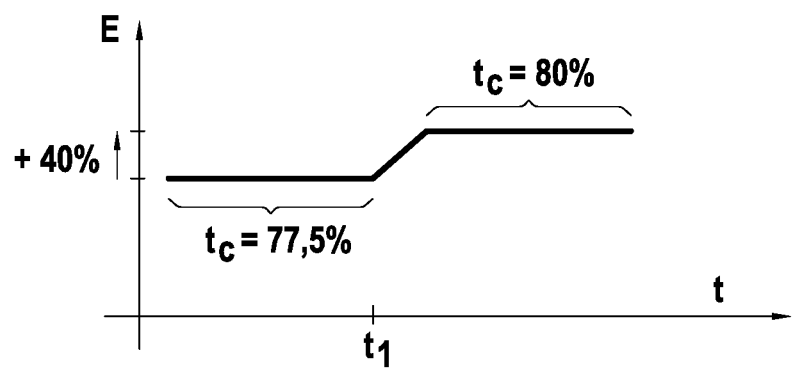
FIG. 5 is a graph plotting the variation in the amplitude of a signal measured by a sensor as a function of time in the event of drift in the composition of the extruded material.

FIG. 5 is a diagram showing the amplitude E of the acoustic signal picked up by an acoustic sensor positioned on the sheath of a twin-screw extruder such as the extruder shown in FIG. 3, and plotted as a function of time. The filling fraction of the extruder is close to 100%. The extruded material comprises a polymer binder, such as hydroxy telechelic polybutadiene (HTPB), and including energetic fillers, e.g. ammonium percholate.

At the beginning of extrusion, the content by weight $t_c$ of filler in the material for extruding was 77.5%. At time $t_1$ the composition of the material being introduced into the extruder was modified so that the filler content was increased to 80%. An increase of 40% was observed in the amplitude E of the signal picked up by the acoustic sensor as a result of changing the composition inside the extruder, with the transition taking place over a duration of a few tens of seconds. Thus, by configuring the monitor system of the installation to detect such a variation in the amplitude E of the signal, the system can inform the operator of such a change and can stop the extruder.

The invention claimed is:

1. A method of extruding a material comprising a binder and one or more energetic fillers and using an installation comprising:
    an extruder comprising a sheath having at least one extrusion screw present therein, the extruder having at least one passive acoustic sensor fastened on the sheath; and
    a monitor system suitable for detecting an anomaly as a function of an acoustic signal picked up by the passive acoustic sensor, the monitor system being configured to measure variations in the amplitude of the acoustic signal picked up by the passive acoustic sensor;
    an extrusion step comprising extruding the material comprising the binder and said one or more energetic fillers through the extruder during which the acoustic signal picked up by the sensor is analyzed by the monitor system, and a continuous detection step for continuously detecting variation in the composition of the extruded material from variation in the amplitude of the acoustic signal, and comprising determining a reduction in amplitude to identify an excess of binder in the extruded material.

2. A method according to claim 1, wherein a variation in a binder/filler ratio is detected during the detection step.

3. A method according to claim 1, wherein the extruder includes at least two extrusion screws.

4. A method according to claim 1, wherein a plurality of passive acoustic sensors are fastened on the sheath, each of these passive acoustic sensors being connected to the monitor system.

5. A method according to claim 4, wherein the passive acoustic sensors are distributed circumferentially around the sheath.

6. A method according to claim 4, wherein the passive acoustic sensors are distributed longitudinally along the sheath.

* * * * *